United States Patent

Matai et al.

[11] Patent Number: 5,420,576
[45] Date of Patent: May 30, 1995

[54] PERSONAL RADIO PAGING RECEIVER HAVING SYNC SIGNAL CONTROLLED DC/DC CONVERTER

[75] Inventors: Masahiro Matai, Tokyo; Hisami Nagai, Shizuoka, both of Japan

[73] Assignee: NEC Corporation, Tokyo, Japan

[21] Appl. No.: 95,985

[22] Filed: Jul. 23, 1993

[30] Foreign Application Priority Data

Jul. 29, 1992 [JP] Japan .................... 4-201701

[51] Int. Cl.$^6$ .................................................. H02J 7/00
[52] U.S. Cl. .............................. 340/825.44; 320/6; 455/343; 340/825.2
[58] Field of Search .......... 340/825.44, 825.2, 825.21; 455/38.2, 38.3, 343, 228, 218, 222; 320/5, 6, 9, 14, 15

[56] References Cited

U.S. PATENT DOCUMENTS

| | | |
|---|---|---|
| 4,085,358 | 4/1978 | Holcomb ................... 320/14 |
| 4,518,961 | 5/1985 | Davis et al. ............... 340/825.44 |
| 4,952,927 | 8/1990 | De Luca et al. ........... 340/825.44 |
| 5,193,211 | 3/1993 | Nobusawa .................. 455/38.2 |
| 5,274,369 | 12/1993 | Tsunoda et al. .......... 455/343 |

*Primary Examiner*—Donald J. Yusko
*Assistant Examiner*—Edward Merz
*Attorney, Agent, or Firm*—Young & Thompson

[57] ABSTRACT

A personal radio paging receiver includes a radio section, a control section, a DC/DC converter, and a secondary battery. The radio section receives/demodulates an external radio signal and outputs a POCSAG signal. The control section divides the POCSAG signal into a first sync signal portion and a second batch signal portion, and outputs a control signal during a period of the first portion. The DC/DC converter operates for only a period during which the control signal is received. The secondary battery supplies power to the control section in synchronism with the second portion. The DC/DC converter is supplied to charge the second battery.

3 Claims, 6 Drawing Sheets

FIG. I
PRIOR ART

PERSONAL RADIO PAGING RECEIVER HAVING SYNC SIGNAL CONTROLLED DC/DC CONVERTER

BACKGROUND OF THE INVENTION

1. Field of the Invention

The present invention relates to a personal radio paging receiver and, more particularly, to a personal radio paging receiver which can prevent a noise disturbance mixed in power supplied from a DC/DC converter.

2. Description of the Prior Art

As shown in FIG. 1, a conventional personal radio paging receiver is constructed by an antenna 101 for receiving information, a radio section 102 for amplifying and demodulating the received signal, a control section 103 for processing the demodulated signal and performing notification, and a DC/DC converter 104. The DC/DC converter 104 supplies power to operate the control section 103. The DC/DC converter 104 has a primary battery 105 which operates as a DC power source. Power is supplied from the DC/DC converter 104 to the control section 103 during its operation. A voltage of about 2 V is required to operate the control section 103. In order to obtain this voltage, the DC/DC converter 104 having the circuit arrangement shown in FIG. 2 is used. More specifically, referring to FIG. 2, a transistor (TR) 404 is turned on/off by an oscillator (OSC) 405. While the TR 404 is ON, the energy is stored in an inductance 401. When the TR 404 is turned off, the energy is supplied to a capacitor 406 through a diode 402. Noise in a voltage V-out output upon this operation has the waveform shown in FIG. 3. That is, noise components A, B, and C are output upon switching of the DC/DC converter 104.

In this conventional personal radio paging receiver, since power containing noise is supplied from the DC/DC converter to the control section, harmonic components caused by noise are radiated within the control section or to the radio section, adversely affecting various electrical characteristics.

SUMMARY OF THE INVENTION

The present invention has been made in consideration of the above situation of the prior art, and has as its object to provide a personal radio paging receiver which prevents switching noise caused by a DC/DC converter from adversely affecting a radio section.

In order to achieve the above object, according to the principal aspect of the present invention, there is provided a personal radio paging receiver comprising a radio section for receiving/demodulating an external radio signal and outputting a POCSAG signal, a control section for dividing the POCSAG signal into a first sync signal portion and a second batch signal portion, and outputting a control signal during a period of the first portion, a DC/DC converter which operates for only a period during which the control signal is received, and a secondary battery for supplying power to the control section in synchronism with the second portion, wherein power from the DC/DC converter is supplied to charge the second battery.

According to the second aspect of the present invention, the personal radio paging receiver of the principal aspect further comprises a charging/discharging circuit constituted by a diode for supplying a charging current from the DC/DC converter to the secondary battery during a period of the first portion, and supplying a current from the secondary battery to the control section during a period of the second portion.

According to the third aspect of the present invention, in the personal radio paging receiver of the principal aspect, an intermittent receiving operation of the radio section for receiving power independently of a primary battery is synchronized with the POCSAG signal and is controlled such that an intermittent operation is started after a preamble of the POCSAG signal.

As is understood from the above description, according to the present invention, the DC/DC converter does not operate at all while the radio section of the receiver is on. Therefore, the radio section is completely free from the influence of noise caused switching of the DC/DC converter, and the electrical characteristics of the radio section and the control section can be improved. There have been strong demands for a reduction in the size of a personal radio paging receiver in order to improve the portability. By applying the present invention to a personal radio paging receiver, the DC/DC converter can be considerably reduced in size.

The above and many other advantages, features and additional objects of the present will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENT

The present invention will be described in more detail below in conjunction with a preferred embodiment shown in the accompanying drawings (FIGS. 4 to 7).

Figure 1:
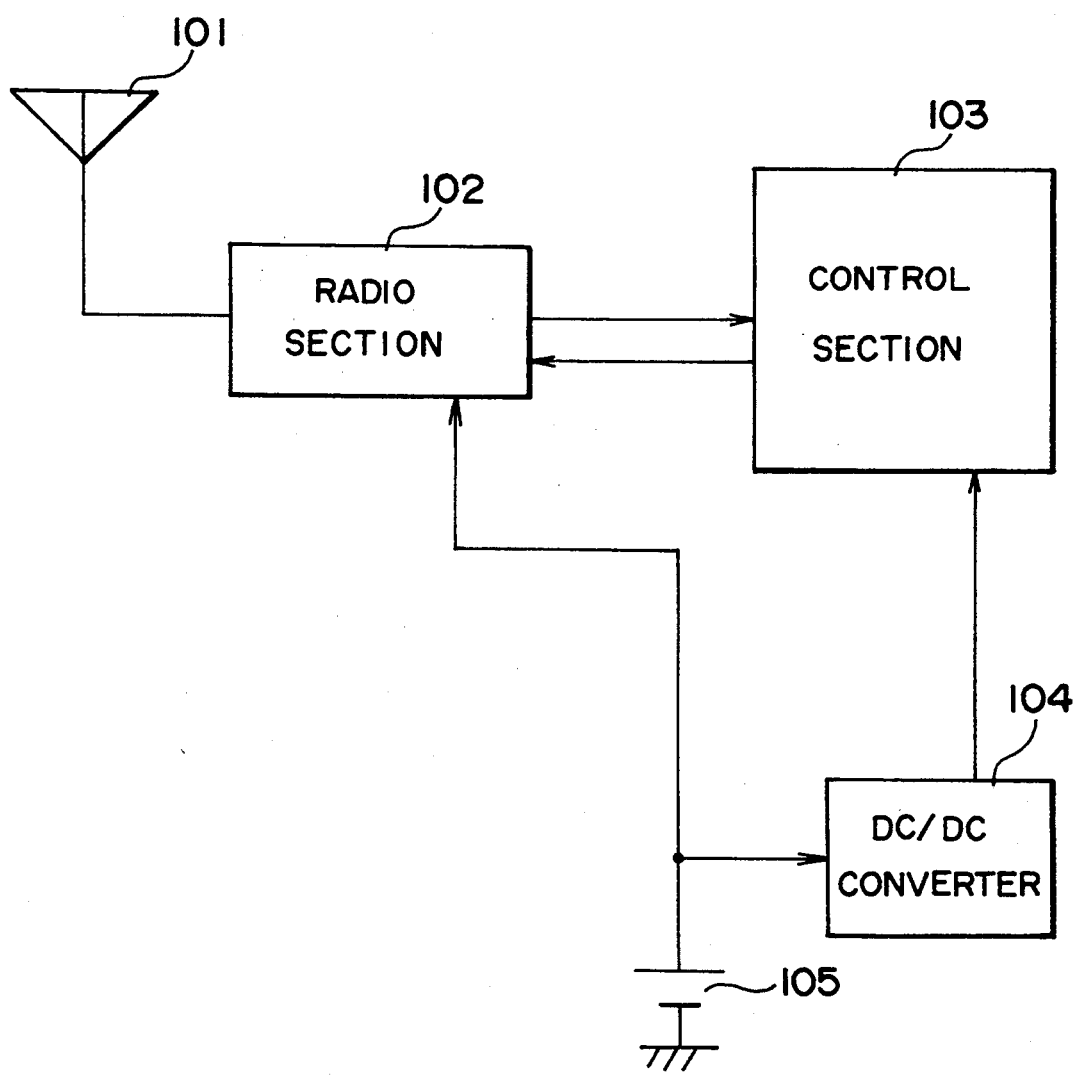
FIG. 1 is a block showing the arrangement of a conventional personal radio paging receiver.
Figure 2:
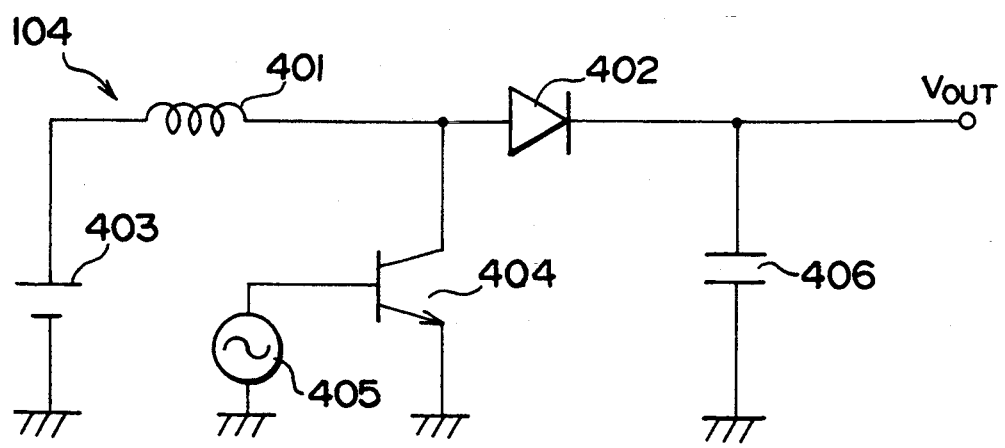
FIG. 2 is a circuit diagram of a conventional DC/DC converter.
Figure 3:
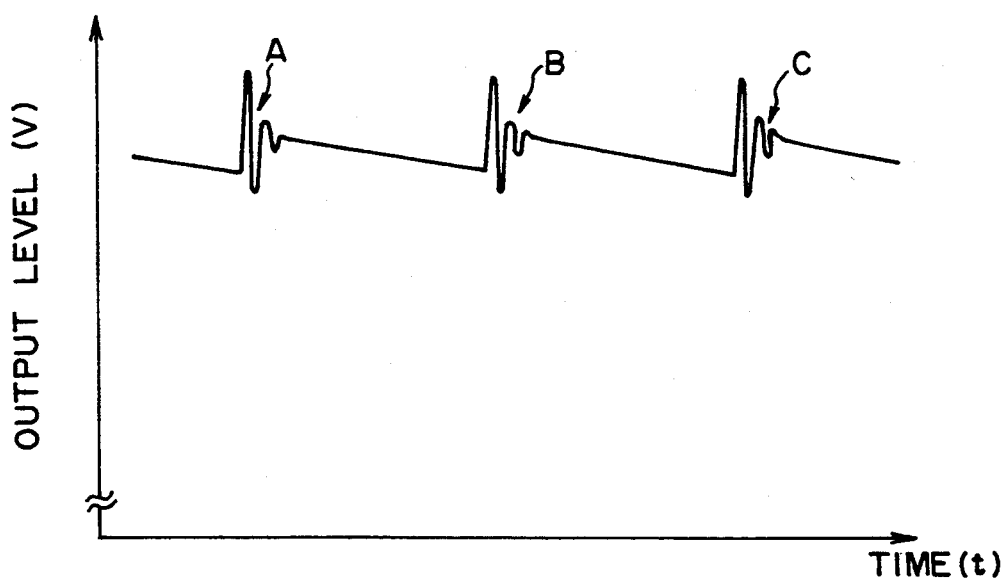
FIG. 3 is a graph showing the waveform of a power supply output in the prior art.
Figure 4:
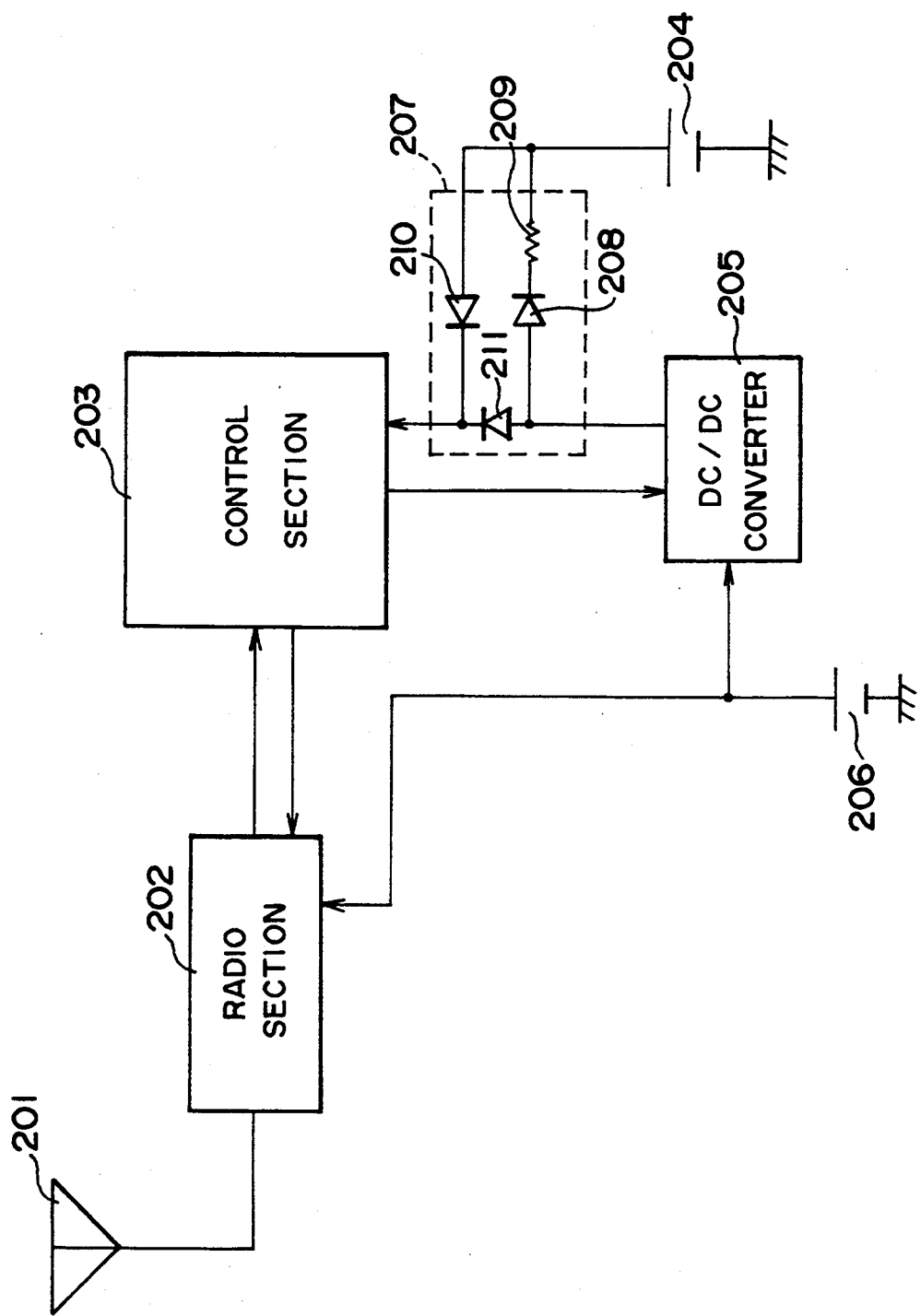
FIG. 4 is a block diagram showing the arrangement of an embodiment of the present invention.
Figure 5:
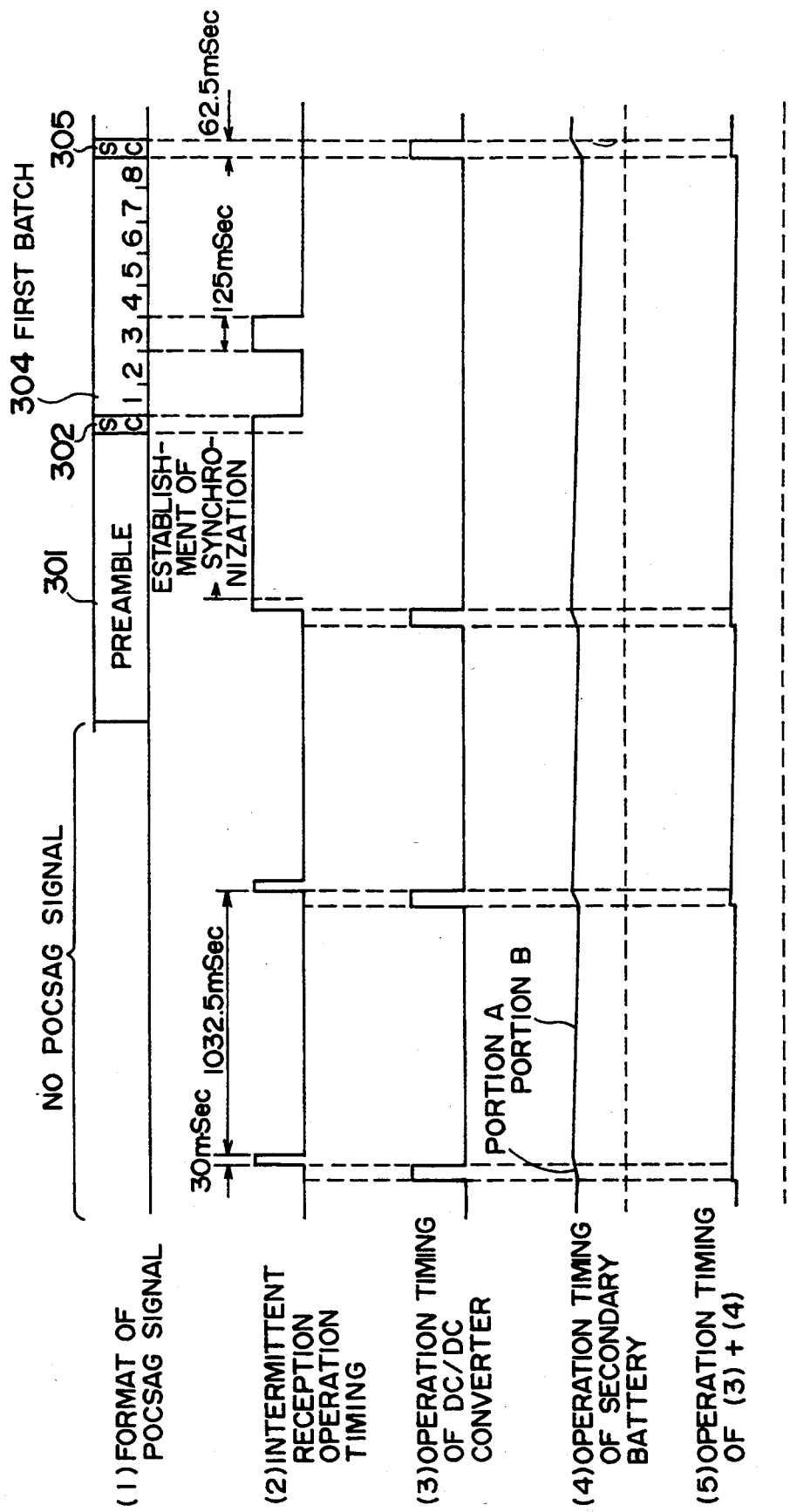
FIG. 5 is a timing chart showing an operation of each component in this embodiment.
Figure 6:
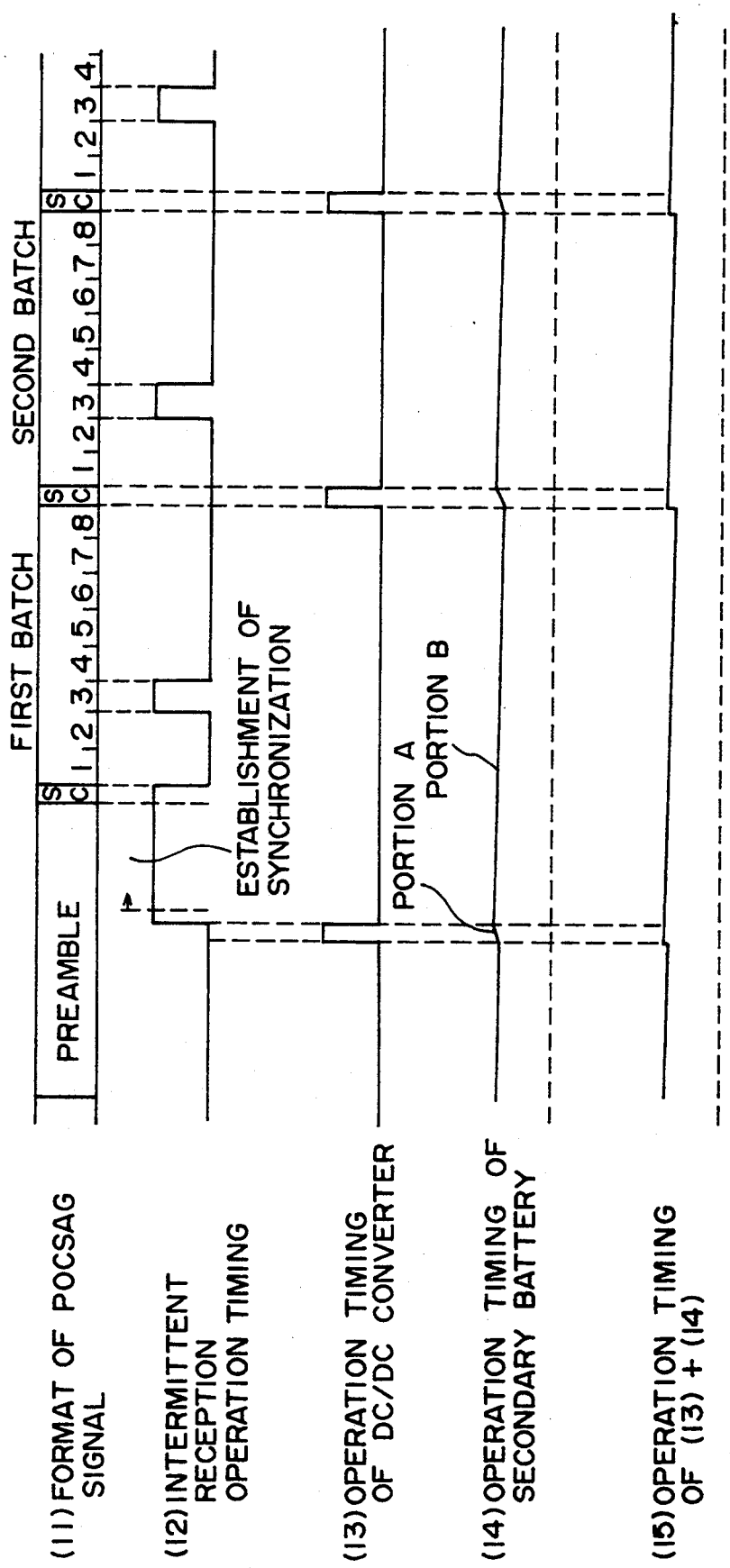
FIG. 6 is a timing chart showing an operation of each component in the embodiment.
Figure 7:
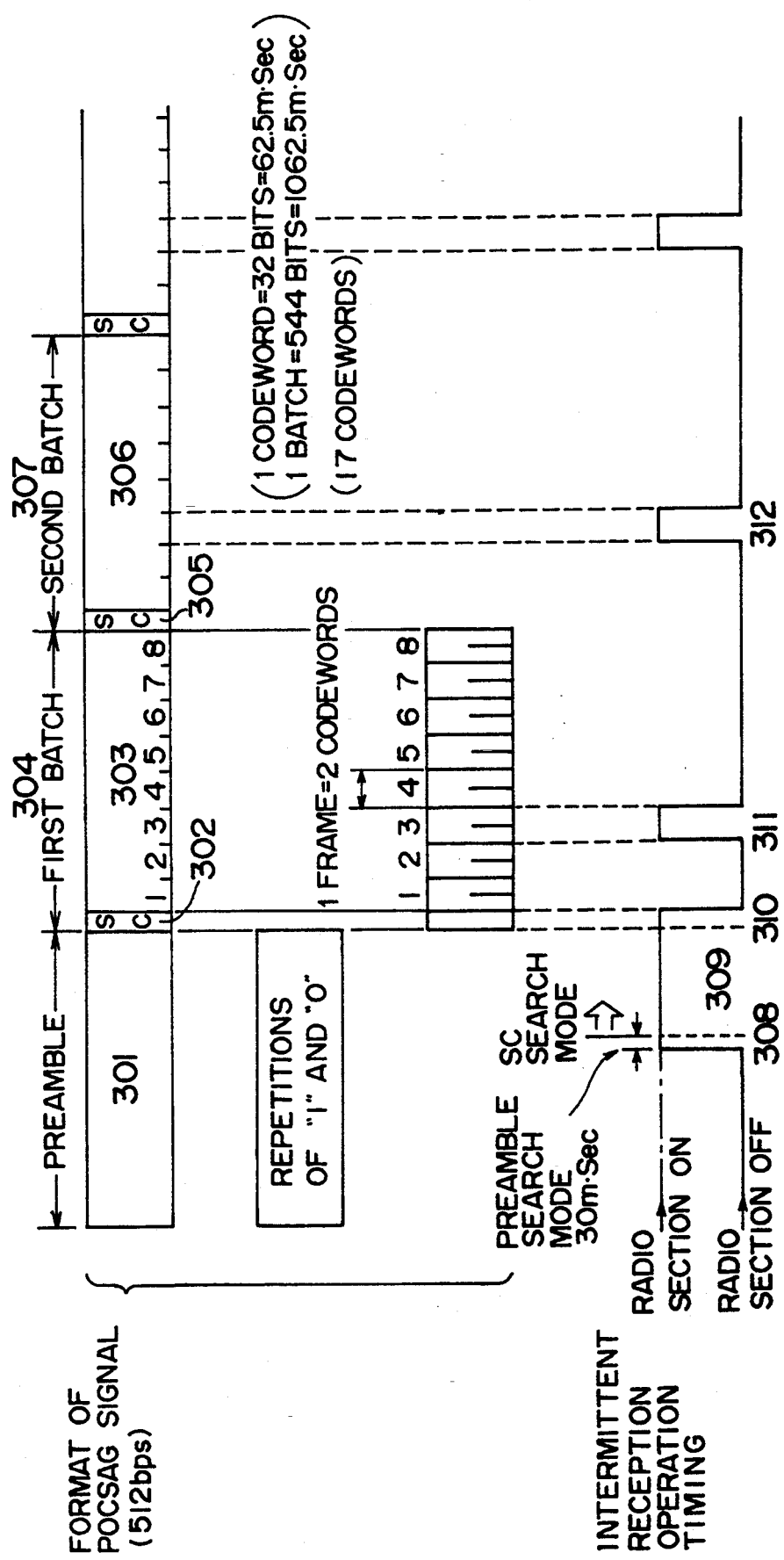
FIG. 7 illustrates a POCSAG signal format used in the embodiment and a timing chart.

FIG. 4 is a block diagram showing an embodiment of the present invention. FIGS. 5 to 7 show a signal and timing charts for explaining power supply operations in the embodiment. Referring to FIG. 4, a power supply circuit for supplying power is constituted by a secondary battery 204, a DC/DC converter 205, a primary battery 206, and a charging/discharging circuit 207. In this embodiment, a control section 203 ON/OFF-controls the DC/DC converter 205. The ON/OFF timing is synchronized with a POCSAG signal (Post Office Code Standardization Advisory Group signal) received through an antenna 201. That is, when a radio section 202 is in an ON state, the output of the DC/DC converter 205 is set in an OFF state. Note that when the output of the DC/DC converter 205 is in an OFF state, the control section 203 is operated by the secondary battery 204 through a diode 210. The secondary battery 204 is sequentially charged through a diode 208 when the output of the DC/DC converter 205 is ON. The output of the DC/DC converter 205 is connected to the secondary battery 204 through the charging/discharging circuit 207. The charging/discharging circuit 207 is constituted by three diodes and one resistor 209. When the DC/DC converter 205 is driven, the secondary battery 204 is charged through the diode 208 and the resistor 209. In addition, power is supplied to the control section 203 through a diode 211. When the DC/DC converter 205 is stopped, the secondary battery 204 supplies power to the control section 203 through the diode 210. When the control section 203 is driven by the secondary battery 204, the diode 211 prevents a reverse current from flowing from the secondary battery 204 to the DC/DC converter 205.

An operation timing of the embodiment will be described next with reference to FIGS. 5 to 7. As shown in FIG. 7, according to the format of the POCSAG signal, the POCSAG signal FSK-modulated with a predetermined frequency is transmitted. The POCSAG signal consists of a preamble 301 and a plurality of batches 304 and 307. Each batch is constituted by a sync signal (Synchronization Codeword) (302 or 305) and eight frames (1 frame=2 codewords=64 bits=125 ms: 525 bits/s) (303 or 306). As indicated at the lower side of FIG. 7, the intermittent reception timing of the radio section 202 is set such that a preamble (repetitions of "1" and "0") is detected first, and a detecting operation with respect to the sync signal SC is started upon detection of the preamble. After the sync signal SC is detected, an intermittent receiving operation is started. According to this intermittent reception timing, since one batch includes eight frames, the control section 203 determines, on the basis of ID data assigned to the receiver, a specific frame at which the radio section 202 is to be turned on (assume, in this case, that the radio section 202 is turned on at the third frame). The sync signals SC of the second and subsequent batches are not received, and the radio section 202 is turned on at the third frame of each batch. Subsequently, the same operation is repeated up to the "n"th batch.

FIG. 5 shows the POCSAG signal and an operation timing of the DC/DC converter 205 during an asynchronous period (e.g., immediately after the power switch of the receiver is turned on). As indicated by "(2)" in FIG. 5, the intermittent reception timing is set such that the radio section 202 is alternately kept ON and OFF for 30 msec and 1,032.5 msec. As indicated by "(3)" in FIG. 5, the operation timing of the DC/DC converter 205 is set such that the converter 205 is kept ON for several msec immediately before the radio section 202 is turned on. The secondary battery 204 is charged (a portion A of "(4)" in FIG. 5) while the DC/DC converter 205 is kept ON. When the DC/DC converter 205 is turned off, supply of power is started (a portion B of "(4)" in FIG. 5). This operation is repeated until a preamble is received.

FIG. 6 shows the POCSAG signal and an operation timing of the DC/DC converter 205 during a synchronous period. Since the receiver receives the sync signal SC of the first batch, the DC/DC converter 205 is not operated by a signal from the control section 203. The radio section 202 does not receive the sync signals SC of the second to nth batches. Therefore, as indicated by "(13)" in FIG. 6, the DC/DC converter 205 repeatedly performs an intermittent operation at intervals (about 62.5 msec) at which the sync signals SC are transmitted. The secondary battery 204 is charged (a portion A of "(14)" in FIG. 6) while the DC/DC converter 205 is in operation. Supply of power from the secondary battery 204 to the control section 203 is started (a portion B of "(14)" in FIG. 6) at the same time when the DC/DC converter 205 is turned off.

It is to be understood that the foregoing is only a preferred embodiment of the present invention, and that the present invention is not limited to this. It will be obvious to those skilled in the art that various changes and modifications may be made without departing from the spirit and scope of the invention.

What is claimed is:

1. A personal radio paging receiver comprising:
   a radio section for receiving/demodulating an external radio signal and outputting a POCSAG signal;
   a control section for dividing the POCSAG signal into a first sync signal portion and a second batch signal portion, and for outputting a control signal during a period of the first portion;
   a DC/DC converter which operates for only a period during which the control signal is received;
   a primary battery for supplying DC power to said radio section and to said DC/DC converter; and
   a secondary battery for supplying power to said control section in synchronism with the second portion,
   power from said DC/DC converter being supplied to charge said secondary battery.

2. A receiver according to claim 1, further comprising a charging/discharging circuit constituted by a diode for supplying a charging current from said DC/DC converter to said secondary battery during a period of the first portion, and supplying a current from said secondary battery to said control section during a period of the second portion.

3. A receiver according to claim 1, wherein an intermittent receiving operation of said radio section for receiving power independently of said primary battery is synchronized with the POCSAG signal and is controlled such that an intermittent operation is started after a preamble of the POCSAG signal.

* * * * *